UNITED STATES PATENT OFFICE.

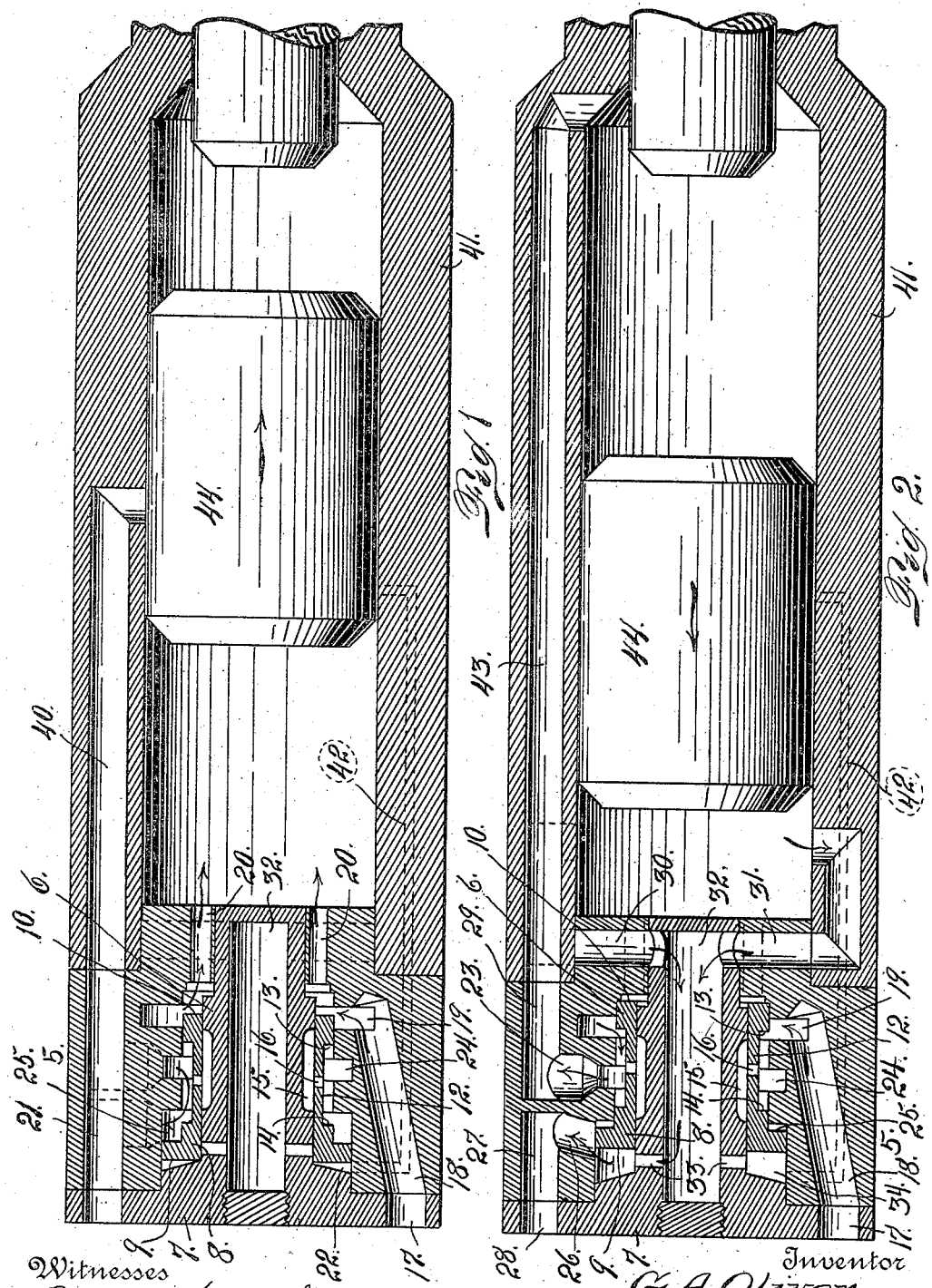

GEORGE A. OLIVER, OF DENVER, COLORADO, ASSIGNOR TO THE STANDARD ROCK DRILL COMPANY, OF DENVER, COLORADO, A CORPORATION OF COLORADO.

VALVE MECHANISM FOR PNEUMATIC TOOLS.

1,090,790.

Specification of Letters Patent.

Patented Mar. 17, 1914.

Application filed April 7, 1913. Serial No. 759,307.

*To all whom it may concern:*

Be it known that I, GEORGE A. OLIVER, a citizen of the United States, residing in the city and county of Denver and State of Colorado, have invented certain new and useful Improvements in Valve Mechanism for Pneumatic Tools; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in valve mechanism for pneumatic tools and may be said to constitute an improvement over U. S. Patent No. 962,717, issued to Vincent J. O'Brien, June 28, 1910, to which reference may be had for a description in detail of the construction and operation of the machine as a whole.

My present invention relates to valve mechanism of this character in which a cylindrical slidably movable valve is employed, the said valve having differential pressure areas at its opposite extremities, the smaller area being continuously acted upon by the live motive fluid while the larger area is intermittently acted upon by the live motive fluid and the exhaust.

The object of this invention is to provide a construction of this character in which the wear incident to the reciprocation of the cylindrical valve shall be reduced to a minimum. One objection to a valve of this character is that, owing to the sharp corners incident to the forming of a centrally located circumferential groove, the adjacent mechanism of the valve has been subjected to undue wear. Some attempts have heretofore been made to overcome this difficulty, one of which is embodied in United States Letters Patent No. 962,717, above referred to, in which to avoid the sharp corners incident to the circumferential groove a series of small perforations have been provided, the said perforations having communication with the extremities of longitudinally disposed orifices. By making these perforations and orifices sufficiently numerous, the perforations are so small that the wear incident to the aforesaid difficulty is greatly reduced. There is, however, an objection to the last-named construction, due to the fact that in order to construct a valve with these perforations there must be sufficient stock or metal to permit the longitudinal boring of the valve from end to end, the extremities of these bores being closed and the perforations heretofore mentioned formed laterally in the valve at the extremities of the longitudinal orifices. This requirement makes it necessary to employ a valve which is heavier than is desirable and the consequence is that the weight of the valve results in the upsetting of its opposite extremities, due to the pounding of these extremities against their adjacent parts during the reciprocating movement of the valve.

My object, therefore, is to overcome this difficulty incident to the weight and at the same time prevent the wear which has heretofore been incident to the sharp corners adjacent the circumferential groove and this object is accomplished by so constructing the valve and the adjacent parts of the valve chest, and the stem or core which the valve surrounds that the valve shall be balanced, that is to say, that the motive fluid which engages the valve both for purposes of inlet and exhaust shall act equally upon the interior and exterior surfaces of the cylindrical structure thus producing a balanced result and practically doing away with the wear usually incident to structures of this character. In accomplishing this result, I form a circumferential groove of suitable width in the exterior surface of the cylindrical valve, and a similar groove in the exterior surface of the central core or stem upon which the valve is mounted and upon which it reciprocates during the operation of the tool. I also provide the body of the valve centrally of this circumferential groove with a series of small perforations whereby the motive fluid which enters the said groove of the valve will also pass through the shell of the latter and occupy the circumferential groove formed in the exterior of the core or stem. From this it will be seen that the pressure will be the same, both interiorly and exteriorly of the valve producing a balanced result and relieving the mechanism from wear, as will be readily understood.

Having briefly outlined my construction, I will proceed to describe the same in detail, reference being made to the accompanying drawing, in which is illustrated an embodiment thereof.

In this drawing—Figure 1 is a section taken through a portion of a rock drill including valve mechanism of the character to which my improvement pertains, the improvement being disclosed in the said view. Fig. 2 is a similar section but taken on a different plane.

The same reference characters indicate the same parts in all the views.

Let the numeral 5 designate the valve-chest or casing having a central opening in which is inserted a core or stem 6, terminating at its rear extremity in a base 7. Mounted on the stem or core portion of this member is a hollow cylindrical valve 8, having a surface 9 at its rear extremity of relatively large area and a surface 10 at its forward extremity of a relatively small area. In mechanisms of this character live motive fluid constantly acts on the surface 6 of lesser area and intermittently on the surface 9 of larger area. This valve is centrally provided with an exterior circumferential groove 12, which is bounded at its opposite extremities by shoulders 13 and 14. Opposite the groove 12 of the valve is a similar groove 15, formed in the core 6 and the shell of the valve is provided with a series of relatively small perforations 16, whereby the two grooves 12 and 15 communicate with each other.

When this structure is in use, the live motive fluid enters a port 17 formed in the base 7 of the core and follows a passage 18 of the valve-chest, the said passage communicating at its forward extremity with a circumferential groove 19 formed in the valve-chest adjacent the cylindrical valve piece 8 and in communication with the groove 12 of the latter when the valve piece is at its forward limit of movement, (see Fig. 2). When, however, the valve piece 8 is at its rearward limit of movement, (see Fig. 1) the live motive fluid from the groove 19 passes forwardly in the direction of the arrows through ports 20 into the hammer chamber (not shown) of the tool for imparting the forward movement of the hammer, the exhaust from the chamber forward of the hammer taking place at first through a passage 40 in the hammer cylinder 41 and a passage 21 of the valve-chest. Practically as soon as the hammer has reached its forward limit of movement live motive fluid is introduced by a passage 42 to a small cavity 22 at the rear of the valve 8 and acts upon its larger area 9 to move the valve to its forward position. Simultaneously with the escape of the exhaust through the passage 21 of the valve-chest, it also enters a passage 43 in the hammer cylinder, a passage 29 and a port 23 in the valve chest and enters a circular groove 24 in communication with the groove 12 of the cylindrical valve, the said exhaust entering the groove 15 of the core through the small perforations 16. The exhaust passes thence from the groove 12 of the valve into a circular groove 25 of the valve-chest and thence through a port 26 into a passage 27, and thence to the atmosphere by way of a port 28. Hence, the pressure of the motive fluid in the two grooves 12 and 15 and acting on opposite surfaces of the cylindrical valve, is equalized, producing a balanced result, and this condition exists during the forward movement of the valve heretofore explained. When the valve is in its forward position, as illustrated in Fig. 2, the hammer 44 begins its return movement, the live motive fluid for this purpose passing from the groove 19 into the groove 12 and thence through the perforation 16 into the groove 15, to produce the balanced result. From the groove 12 the fluid passes to the groove 24 and thence through the port 23 to the passage 29 and thence forwardly through the passage 43 to the hammer chamber in front of the hammer. This condition obtains until the hammer reaches its rearward limit of movement, when the valve is again shifted rearwardly and the operation heretofore described is repeated. During the rearward movement of the hammer the exhaust takes place through passages 30 and 31 formed in the forward extremity of the valve chest and communicating with a central passage 32, from which the exhaust escapes through perforations 33 into the cavity 34 in the rear of the valve, thence through the port 26 to the passage 27 and thence to the atmosphere through a port 28. From this it will be understood that during both movements of the cylindrical valve incident to the operation of a tool of the character in which a valve of this style is employed, the pressure of the live motive fluid will be equalized on both the interior and exterior surfaces of the valve, thus practically relieving the valve from friction and the wear incident thereto.

Having thus described my invention, what I claim is:

1. In valve mechanism for pneumatic tools, the combination with a valve chest or casing having a centrally located stem or core, of a motive fluid actuated cylindrical valve piece located in a cavity of the chest surrounding the stem, the said valve piece being exteriorly grooved for the passage of the motive fluid during the operation of the tool, the stem being also exteriorly grooved adjacent the valve piece, the two grooves being substantially the same size, the valve piece being perforated to permit the fluid to fill the groove of the stem simultaneously with its entrance to the groove of the valve piece to produce a balanced result.

2. The combination of a valve chest having a centrally located exteriorly grooved stem surrounded by a cavity in the chest, and a motive fluid actuated valve piece located in said cavity and also exteriorly grooved for the passage of the motive fluid during the operation of the tool, the grooves of the valve piece and stem being of substantially equal capacities, and in communication, for the purpose set forth.

3. The combination of a valve chest having a centrally located core separated from the body of the chest by a cavity and having a circumferential groove in communication with the cavity, and a cylindrical valve piece slidably mounted in said cavity and also exteriorly grooved, the two grooves being in communication and of substantially equal capacities for balancing purposes.

4. The combination of a valve chest or casing having a centrally located core and a cylindrical valve located in a cavity surrounding the core and mounted to reciprocate therein, the valve piece and the core having intercommunicating circumferential grooves of similar capacities adapted to receive motive fluid during the operation of the tool.

5. The combination of a valve chest or casing having a central stem and an annularly arranged cavity between the stem and the body of the chest, and a valve piece located in said cavity, the valve and core having intercommunicating circumferential grooves of substantially equal capacities adapted to receive motive fluid during the operation of the tool, the valve piece having differential pressure areas and being mounted to reciprocate under the influence of the motive fluid employed in the operation of the tool.

6. The combination of a valve chest having a centrally located stem surrounded by an annular cavity, a valve piece located in the said cavity, the said valve piece and stem having circumferential intercommunicating grooves of substantially equal capacities, the chest adjacent the valve piece also having additional circumferential grooves coöperating with the groove of the valve piece to facilitate the passage of the motive fluid for tool operating purposes.

7. In valve mechanism for pneumatic tools, the combination of a valve chest having a centrally located stem or core surrounded by an annular cavity, the body of the chest having grooves, ports and passages through which the motive fluid passes during the operation of the tool, and a valve piece located in said cavity and surrounding the core, the said valve piece and core having adjacent circumferential intercommunicating grooves of substantially equal capacities, also in communication with certain grooves, ports and passages, of the valve chest, the valve piece being mounted to reciprocate and having differential pressure areas upon which the motive fluid acts for said purpose, substantially as described.

8. In a device of the class described, the combination of a valve chest or casing having a centrally located core, and an interposed annular cavity and a cylindrical valve piece mounted to reciprocate in said cavity, the valve piece and core having intercommunicating circumferential grooves of substantially equal capacities, substantially as described.

9. In combination a valve chest, having a centrally located core, the latter being provided exteriorly with a circumferential groove, a cylindrical valve piece slidably mounted upon said core and also exteriorly grooved circumferentially, means for introducing live air to both grooves during the operation of the valve, said grooves being so arranged that the greater portion of the one in the valve piece will lie opposite that in the core in all positions of the valve piece.

10. In combination a valve chest having a centrally located core, the latter being provided exteriorly with a circumferential groove, a cylindrical valve piece slidably mounted upon said core and also exteriorly grooved circumferentially, said valve piece having perforations therethrough for placing the two grooves in communication, said grooves being so arranged that the greater portion of the one in the valve piece will lie opposite that in the core in all positions of the valve piece.

In testimony whereof I affix my signature in presence of two witnesses.

GEORGE A. OLIVER.

Witnesses:
A. J. O'BRIEN,
C. M. WAUDBY.